(12) United States Patent
Brummel (10) Patent No.: US 6,564,178 B1
(45) Date of Patent: May 13, 2003

(54) METHOD AND APPARATUS FOR EVALUATING PROCESSORS FOR ARCHITECTURAL COMPLIANCE

(75) Inventor: Karl P Brummel, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,806

(22) Filed: Apr. 13, 1999

(51) Int. Cl.⁷ .................................................. G06F 9/45
(52) U.S. Cl. ............................. 703/22; 703/17; 716/4; 712/227; 714/739; 702/117
(58) Field of Search ...................... 703/13–28; 716/1–4; 712/227; 702/117; 714/739

(56) References Cited

U.S. PATENT DOCUMENTS 5,680,584 A * 10/1997 Herdeg et al. ................. 703/20
5,857,091 A * 1/1999 Fernandes et al. ............. 703/21
6,298,320 B1 * 10/2001 Buckmaster et al. .......... 703/19

OTHER PUBLICATIONS

Hookway, "Digital FX!32: Running 32–Bit x86 Applications on Alpha NT", IEEE Proceedings of Compcon '97, pp. 37–42 (Feb. 1997).*

Monaco et al, "Function Verification Methodology for the PowerPC 604 Microprocessor", ACM 33rd Design Automation Conference, pp. 319–324 (Sep. 1996).*

* cited by examiner

Primary Examiner—Samuel Broda (57) ABSTRACT

The present invention provides a method and apparatus for testing architectural compliance of processors wherein various types of cases requiring some structure can be simulated and a degree of randomness can be added to the case without destroying the structure of the case. The apparatus comprises a computer capable of being configured to execute a testing program. When the computer is executing the testing program, the computer generates instructions and simulates execution of the instructions in a processor. During simulation, the computer detects when simulation of an instruction has caused an event to occur in the processor. The computer identifies the event that has occurred and generates a list of atoms and stores the list in a memory device in communication with the computer. Each of the atoms in the list corresponds to a description of a particular event handler task to be performed by the processor in response to the occurrence of the event. The atoms are then read out of the list and instructions corresponding to the atoms are generated and simulated to handle the event. The sequence in which these instructions are simulated can be randomized by either inserting the atoms into the list with a degree of randomness or by reading the atoms out of the list with a degree of randomness. The degree of randomness is added to the case without destroying the structure of the case.

31 Claims, 4 Drawing Sheets

METHOD AND APPARATUS FOR EVALUATING PROCESSORS FOR ARCHITECTURAL COMPLIANCE

TECHNICAL FIELD OF THE INVENTION

The present invention relates to a method and apparatus for evaluating processors for architectural compliance and, more particularly, to a method and apparatus which imposes a predetermined amount of constraint, or structure, on a randomly generated case being used to evaluate or test a processor for architectural compliance.

BACKGROUND OF THE INVENTION

In the industry of microprocessor design and implementation, microprocessors are tested to determine whether or not they are architecturally compliant, i.e., whether or not they have been designed correctly to meet all architectural requirements. Presently, in order to test the microprocessor, exceptional events are generated, such as traps, faults and aborts. These types of events place the microprocessor in an interesting state and often are difficult for the microprocessor to handle properly. Therefore, it is desirable to test the microprocessor to ensure that it is capable of properly handling these types of events.

Figure 1:
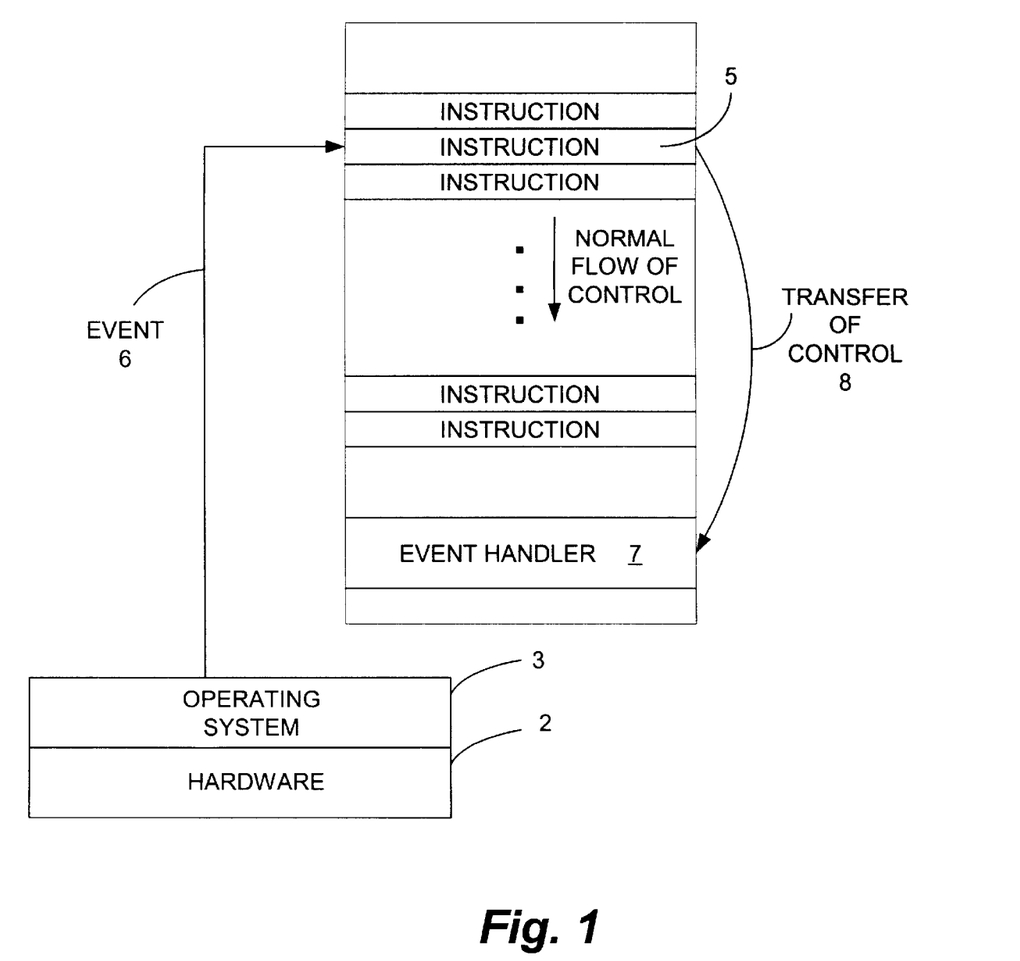
FIG. 1 is a block diagram demonstrating transfer of control to an event handler when an exceptional event occurs.

When an exceptional event occurs, the microprocessor transfers control to a trap handler, which is code that resides at an architecturally-defined address. FIG. 1 is a block diagram that illustrates exception handling during normal execution of an application program. FIG. 1 depicts a program being executed by hardware 2 running operating system 3. When an event 6 occurs during execution of the instructions comprised by the program, the normal flow of control of execution is transferred, as indicated by arrow 8, from the point of interruption 5 to the event handler routine 7. The input to the event handler routine 7 corresponds to the instruction pointer at the point of interruption 5 and the hardware register state at the point of interruption.

Once the event has been handled by the event handler routine 7, execution resumes from the point of interruption 5 in accordance with the normal flow of control of execution. The first few instructions of a trap handler are executed with the processor in a very interesting state. A variety of state machines are in the process of responding to the event.

In the past, in order to test architectural compliance of the microprocessor, random code generators have been utilized to generate specific code and to simulate execution of the code by the microprocessor. The specific code may or may not cause an event to occur. When an exceptional event does occur during the simulation, the various states of the registers of the microprocessor during the simulations are known. The correct states of the registers, i.e., what the values in the registers should be, is also known since synchronous events are predictable. The values obtained from the simulation may then be compared against the correct values to determine whether or not the microprocessor handled the event properly.

By utilizing a random code generator to randomly generate instructions to be executed by the microprocessor, the amount of randomness interjected into the testing process is increased which, in turn, increases the robustness of the testing process. However, the amount of randomness inherent in the process is constrained. When an instruction results in the occurrence of a particular exceptional event, the trap handler instructions associated with the particular event are executed in the same manner each time the trap handler is called. For example, if the trap handler is to perform a series of tasks which cause five different registers to be set to certain values, these tasks are performed in the same order and in the same manner each time the trap handler is called. Therefore, there is no randomness with respect to the manner in which the trap handler itself performs its functions.

It would be desirable to randomize the manner in which the trap handler performs its tasks to thereby increase the overall randomness of the testing process. Accordingly, a need exists for a method and apparatus for randomizing the performance of the tasks by the trap handlers. The present invention allows the manner in which the trap handler tasks are performed to be further randomized, as described below in detail. This ability to further randomize the trap handler tasks allows the processors to be tested more rigorously for architectural compliance due to the fact that the processor is not responding to an event in the same, identical manner each time the event occurs.

It would also be desirable to generate other types of "non-exceptional" events in order to evaluate the ability of a processor to properly respond to these types of events. For example, it would be desirable to generate and simulate a call-return instruction pair in order to determine whether a processor properly handles this type of event. Processors currently exist that implement mechanisms for performing branch prediction. These types of events, i.e., branches, could be generated and simulated in order to test the ability of the processor to properly respond to them. Since the execution of the call instruction must always be performed before the execution of the return instruction, the manner in which this type of event is generated is structurally constrained. It would be desirable to allow these types of events to be generated with some degree of randomness so that the processor is not performing the tasks associated with an event in the same, identical manner each time the event occurs. However, the degree of randomness must be constrained a sufficient amount to ensure that the event is generated with the necessary amount of structure.

Accordingly, a need exists for a method and apparatus for generating and simulating various types of cases requiring some structure while adding a degree of randomness to the case without destroying the structure of the case.

SUMMARY OF THE INVENTION

The present invention provides a method and apparatus for testing architectural compliance of processors wherein various types of cases requiring some structure can be simulated and a degree of randomness can be added to the case without destroying the structure of the case. The apparatus comprises a computer capable of being configured to execute a testing program. When the computer is executing the testing program, the computer generates instructions and simulates execution of the instructions in a processor. During simulation, the computer detects when simulation of an instruction has caused an event to occur in the processor. The computer identifies the event that has occurred and generates a list of atoms and stores the list in a memory device in communication with the computer. Each of the atoms in the list corresponds to a description of a particular event handler task to be performed by the processor in response to the occurrence of the event. The atoms are then read out of the list and instructions corresponding to the atoms are generated and simulated to handle the event. The sequence in which these instructions are simulated can be randomized by either inserting the atoms into the list with a degree of randomness or by reading the atoms out of the list with a degree of randomness. The degree of randomness is added to the case without destroying the structure of the case.

The structure of the case is protected by configuring the list with unordered and ordered atoms. The list comprises at least one unordered atom and at least one ordered atom. The unordered atoms correspond to one or more event handler tasks that can be performed in any order. The ordered atoms correspond to one or more event handler tasks that must be performed after the tasks associated with the unordered atoms have been performed. For example, the ordered atom may correspond to an instruction which causes a return to the point of execution at which the event handler was called. The computer reads the atoms out of the list and generates and simulates one or more instructions corresponding to each of the atoms. The instructions corresponding to the unordered atoms are simulated before simulation of the instructions corresponding to the ordered atoms.

In accordance with the preferred embodiment of the present invention, the computer randomly selects locations in the list in which the unordered atoms are to be stored and stores the unordered atoms at the selected locations. The computer stores the ordered atom at a particular location in the list, preferably at the end of the list. The computer reads the atoms out of the list in such a sequence that the ordered atom is the last atom read out of the list. The computer generates and simulates instructions corresponding to each of the atoms as the atoms are read out of the list. Preferably, the computer reads the atoms out of the list in sequence from top to bottom so that the ordered atom is the last atom read out of the list.

Preferably, the test program is a random code generation program. In accordance with the preferred embodiment, after an unordered atom has been read out of the list and before an ordered atom has been read out of the list, the random code generation program generates at least one random instruction and simulates the random instruction. This allows the sequence in which the event handler tasks are simulated to be further randomized. In accordance with this embodiment, after an event has been detected, the random code generation program makes a determination as to whether a random instruction should be generated and simulated or whether an atom should be read out of the list and an instruction corresponding to the atom should be generated and simulated. On some occasions, the random code generation program determines that a random instruction should be generated and simulated and on other occasions the random code generation program determines that an atom should be read from the list and an instruction corresponding to the atom should be generated and simulated.

These and other advantages and features of the present invention will become apparent from the following description, drawings and claims.

DETAILED DESCRIPTION OF THE INVENTION

The present invention preferably is implemented in accordance with a random code generation program which is used to generate random code which is then simulated for the purpose of testing a microprocessor for architectural compliance. The apparatus of the present invention, hereinafter referred to as the random code generator, preferably comprises a computer, such as a computer comprising the hardware 2 and operating system 3 shown in FIG. 1, which is capable of being configured to execute the random code generation program of the present invention. Therefore, the present invention will be described in this context. However, it will be understood by those skilled in the art that the present invention may be implemented as a separate program which is not an integral part of a random code generation program. It should also be noted that although the present invention is being described as being implemented in software, those skilled in the art will understand that the present invention may also be implemented in hardware or in a combination of hardware and software or in firmware.

In accordance with the present invention, the tasks to be performed by an event handler are broken down into discrete units hereinafter referred to as "atoms." Each atom preferably is a high-level description of a particular task, or group of tasks, to be performed by the event handler. The atoms preferably are not the actual instructions to be performed by the event handler. Once the atoms have been generated, they are stored in a list in a memory device (not shown). If the order in which a particular atom is performed, or "split", is not important, the atom may be placed anywhere in the list. These types of atoms are referred to hereinafter as "unordered atoms". If the order in which a particular atom is split is important, the atom is placed at a predetermined location in the list. These types of atoms are referred to hereinafter as "ordered atoms".

In accordance with the preferred embodiment of the present invention, ordered atoms are placed at the end of the list. Unordered atoms may be inserted anywhere in the list after the last ordered atom. For example, if an event handler is to perform the tasks of changing three control registers and then returning to the instruction that caused the event handler to be called, the values in the three control registers may be changed in any order, provided their new values are set before the microprocessor returns to the instruction that caused the event handler to be called. In this example, three unordered atoms (i.e., the register updates) are generated and one ordered atom (i.e., the return from interrupt) is generated. Atoms represent sub-tasks which must be completed in handling the event. If the order of completion of the sub-tasks is unimportant, the atoms may be split in a random order, which can be implemented in a plurality of ways, as discussed below in more detail.

In accordance with the preferred embodiment of the present invention, after all the atoms have been generated and stored in the list, but before any instructions to handle the event have been generated, random code generation resumes. During generation of a test case, the random code generator selects either an atom from the list to be split, or chooses to generate unrelated random code. The list of atoms guarantees that the cause of the event will be "fixed" by the time the list of atoms is empty since the last atom in the list is ordered and represents the final sub-task to be performed in handling the event, such as returning to the instruction that caused the event. Therefore, random instructions may be generated and simulated after the event has occurred and between generation and simulation of instructions corresponding to the tasks to be performed by the event handler. These random instructions may include those that overwrite trap parameter registers and other data normally needed to handle the event. The random instructions may also include instructions that generate exceptional events themselves, as well as instructions that generally manipulate processor state in a random manner.

By allowing the random code generator to generate and simulate random instructions at various times after the event has occurred, the overall randomness of the testing process is further increased. Therefore, the sequencing of instructions to handle the event is random (within the ordering constraints of the atoms in the list), and each atom may be surrounded by randomly generated code completely unrelated to handling the event. The generation of atoms is simple to implement, as is the consumption of atoms from the list.

As stated above, unordered atoms may be stored at any location in the list. Therefore, the locations for the unordered atoms in the list may-be selected randomly. This random ordering of the atoms in the list results in random execution of the tasks of the event handler when the atoms are read out of the list from top to bottom and the tasks corresponding to the atoms are performed. It should be noted that, rather than storing in the list in a random order, the atoms could be stored in the list in a predetermined order (e.g., in the order in which the tasks are normally performed by the event handler) and the atoms can be read out of the list in a random order. Those skilled in the art will understand that the present invention is not limited to the particular manner in which the order that the tasks of the event handler are performed is randomized.

Another example of an event that must be handled by a processor is a call-return instruction pair. When generating random instructions, it is very difficult to get useful, program-like call-return sequences. This is due to the fact that these types of events require structure and, as the name implies, random code generators are designed to generate code without structure. In the past, microprocessors implemented relatively little branch prediction, especially for indirect branches (i.e., returns). Processors are becoming ever increasingly elaborate, and, as stated above, processors now exist that employ mechanisms which perform branch prediction. As with the mechanisms associated with testing exceptions, these branch prediction mechanisms should also be tested for correctness.

Order, or structure, is inherent in the call-return instruction pair because the execution of the call instruction must precede the execution of the return instruction. This structure would present a problem for a typical random code generator. In the call-return case, when a call is made, the call instruction typically causes the processor to write the program counter of the instruction to a register or memory. The program counter written to the register is usually called the "return link". The return instruction uses the return link to return to the instruction that follows the call instruction. The return instruction is aware of the call instruction and of either the location (i.e., register) at which that the return link is stored, or of the address following the call instruction.

Ordinarily, it is likely that any random instructions in between the call and return instructions will destroy the return link, especially if it is stored in a register. This is due to the fact that the random instructions may overwrite the register containing the return link. Utilizing the method and apparatus of the present invention, it can be ensured that the return instruction task is contained in a return atom and that this atom is the last atom is split. In essence, the return atom is provided with either the identity of the register at which the return link is stored or with the address of the instruction following the call instruction. Alternatively, the return atom can generate the return link. This allows random instructions to be generated and simulated after the call atom is split and before the return atom is split without the possibility of the random code destroying the return link. Thus, the atoms ensure that the return instruction causes a return to the intended address when the return atom is split, while randomization is not unduly constrained.

Atoms may also be designed to preserve resources, such as registers or locations in memory that need to be preserved. This may be accomplished by a variety of techniques. For example, the return atom could be provided with the address of the instruction following the call instruction. In this case, the return atom would cause one instruction to be generated that would cause the return address to be loaded into the appropriate register location, and one instruction to be generated that would cause the return address to be read out of the register to thereby cause the processor to return to the instruction following the call instruction. Therefore, even if the return address was overwritten, this would not prevent the processor from returning to the instruction following the call instruction.

If the return address is available, the return atom, when split, will not cause the return link to be saved in the register, but rather, will merely return to the instruction designated by the return link. The random code generator has internal state relating to transactions occurring in the random code generator. The random code generator uses this internal state to select destination and target registers. For example, the random code generator will not write to a register that has been written to until the contents of the register have been read. Otherwise, the result of an instruction would be lost.

An alternative to having the return atom generate instructions that cause the processor to load a register with the return address and to return to the instruction following the call instruction, the call atom could cause the internal state of the random code generator to mark a register as read-only. This would allow random instructions to read, but not overwrite, the value it held in the register. The return atom, when split, could cause the internal state of the random code generator to mark the register as available for general use.

Another example of events that could be generated and simulated to test processors is loops. In order to generate and simulate a loop, three tasks must be performed, namely, a count must be generated, the count must be changed when necessary, and a conditional branch must be generated that terminates the loop after a predetermined number of iterations. Therefore, this type of event requires quite a bit of structure. It would be desirable to randomize the handling of this type of event in order to increase the robustness of the test. Of course, it would be extremely unlikely for a random code generator to ever generate a sequence of instructions that had the necessary structure for duplicating this type of event. Although specific instructions could be generated to duplicate this type of event, the instructions would occur in the same, identical order each time the event occurred.

An example will now be provided of the manner in which the method and apparatus of the present invention could be utilized to simulate the handling of this type event while adding a degree of randomness to the event without destroying the structure necessary for the event. The loop event could be generated by an occurrence outside of the random code generation process which is detectable by the random code generator of the present invention. For example, the event could be created by a user setting a variable in a control file utilized by the random code generator. If the random code generator detects a loop event, three atoms, for example, might be generated. One atom causes instruction(s) to be generated which cause the processor to set a register to the loop count. One atom causes instruction(s) to be generated which cause the processor to alter (i.e., increment or decrement) the loop count in each iteration of the loop. One atom causes instruction(s) to be generated which cause the processor to branch back to the top of the loop when a particular condition occurs.

All of these atoms are ordered. In accordance with the present invention, the process of handling this event can be randomized. As atoms are split, they can be mixed with a random number of instructions without destroying the structure of the loop. This is very advantageous because the structural framework of the loop is left intact, but the majority of the body of the loop may be random instructions. Furthermore, these random instructions may be generated without knowledge of the loop structure.

It will be understood by those skilled in the art that the types of events discussed above are only examples of the types of events that can be tested using the method and apparatus of the present invention. Those skilled in the art will understand that the present invention is not limited with respect to the types of events that are generated for the purpose of testing processors. It will also be understood by those skilled in the art that the present invention can be utilized to generate purely structured cases or cases having a degree of structure and a degree of randomness. Those skilled in the art will understand that the present invention is not limited with respect to the amount of randomness injected into a case having a degree of structure.

Figure 2:
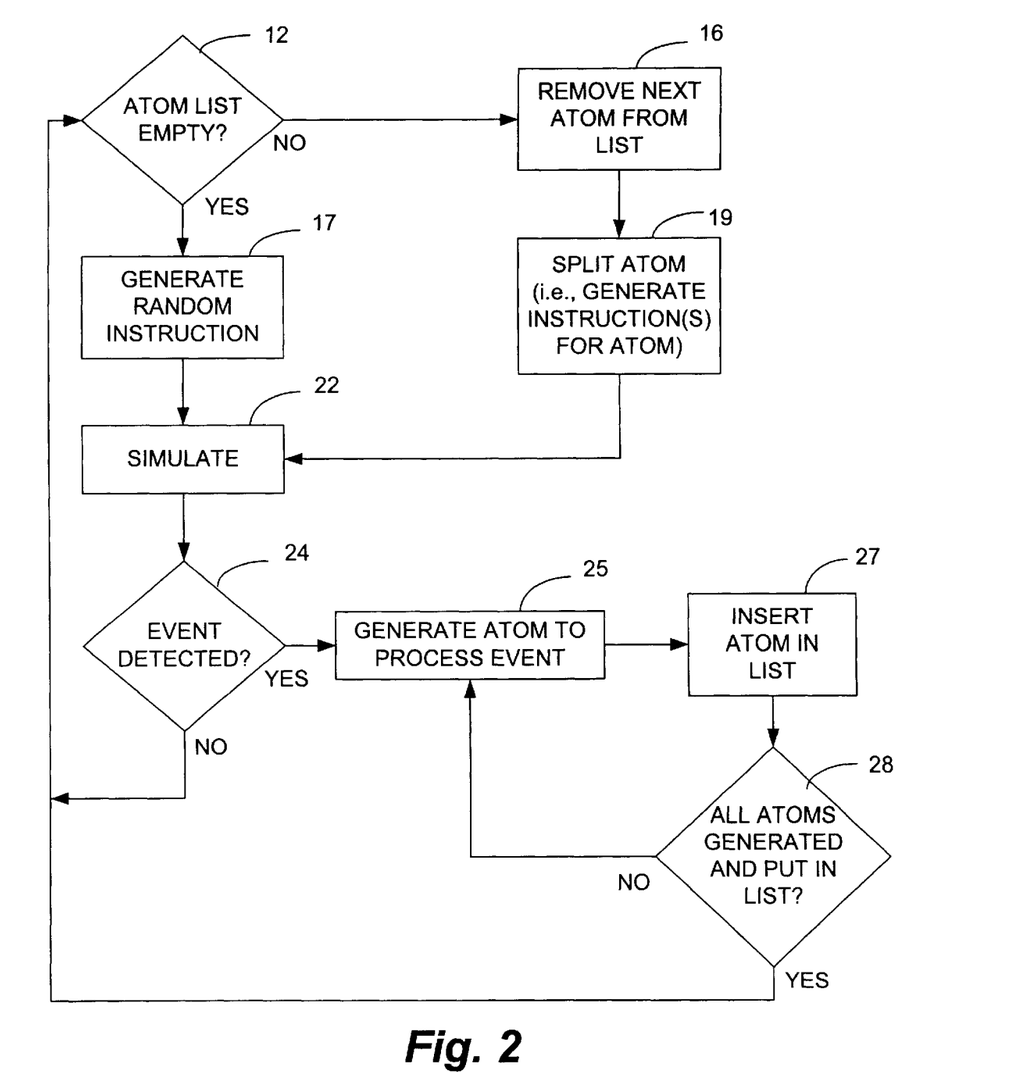
FIG. 2 is a flow chart illustrating the method of the present invention in accordance with a first embodiment for generating code to be used for testing architectural compliance in microprocessors.

FIG. 2 is a flow chart illustrating the random code generation method of the present invention in accordance with a first embodiment. In accordance with this embodiment, random code generation and simulation does not continue after an event occurs until the random code associated with all of the atoms on the list has been generated and simulated. Assuming that an event has not yet occurred, a determination will be made at block 12 that the atom list is empty. The process will then proceed to block 17 where random code will be generated by the random code generator. As stated above, this random code corresponds to instructions which may or may not cause an event to occur during simulation. Once the random code has been generated at block 17, the random instructions are simulated at block 22.

A determination is then made at block 24 as to whether or not an event has been detected. If not, the process will return to block 12 and random code will continue to be generated and simulated at blocks 17 and 22. This process of generating the random code will continue until an event is detected at block 24. Once an event is detected, the random code generator will begin generating the atoms that correspond to the tasks to be performed by the event handler which handles the event, as indicated by block 25. As the atoms are generated, they are inserted into the list, as indicated by block 27. The random code generator determines which of the atoms are unordered and which of the atoms are ordered. As stated above, an ordered atom is the atom that completes the task. The ordered atom will be the last atom in the list to ensure that all of the tasks which must be performed by the event handler have been performed before returning to the point at which the event handler was called.

A determination is made at block 28 as to whether or not all of the atoms associated with the event have been generated and inserted into the list. If not, the process returns to block 25. Once all of the atoms have been generated and inserted into the list, the process returns to block 12 where a determination is made as to whether or not the atom list is empty. Assuming an event has occurred and the atom list has been generated, the process will proceed from block 12 to block 16 where an atom is removed from the list and, at block 19, the atom is split. As stated above, preferably the atoms are removed from the list in an order from the top of the list to the bottom of the list. Once the atom has been removed from the list, the random code generator generates the instructions associated with the atom at block 19 and the process proceeds to block 22 where the instructions associated with the atom are simulated.

It is possible that in simulating the instructions associated with an atom, these instructions may cause an event to occur. Therefore, the process proceeds to block 24 where a determination is made as to whether or not an event has occurred. If so, the process will proceed to blocks 25, 27 and 28, as discussed above in detail. If the instructions being simulated which are associated with the atom do not cause an event to occur, the process will proceed from block 24 to block 12 where a determination is made as to whether or not the atom list is empty. Assuming all of the atoms on the list have not yet been processed, the process will proceed to block 16 and an atom will be removed from the list, as discussed above in detail. The code corresponding to the atom will then be simulated at block 22 and a determination will be made at block 24 as to whether or not simulation of the random code caused an event to occur. Once a determination is made that all of the atoms on the list have been split, the process will return to block 17 and random code will continue to be generated and simulated.

Figure 3:
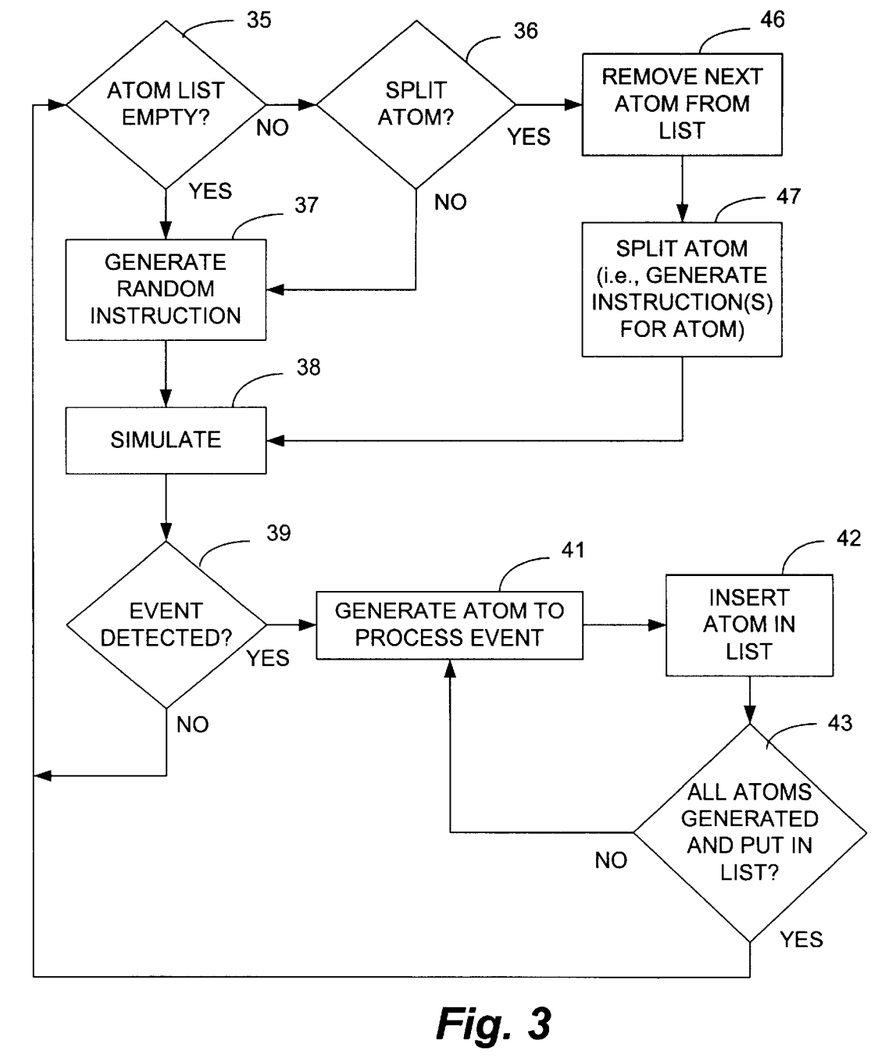
FIG. 3 is a flow chart illustrating the method of the present invention in accordance with a second embodiment for generating code to be used for testing architectural compliance in microprocessors.

FIG. 3 is a flow chart illustrating the random code generation method of the present invention in accordance with the preferred embodiment. In accordance with this embodiment, random code generation and simulation continues after an event occurs and during the generation and simulation of the code corresponding to the atoms. In all other respects, the process shown in FIG. 3 is identical to the process shown in FIG. 2 and discussed above in detail. Assuming that an event has not yet occurred, a determination will be made at block 35 that the atom list is empty. The process will then proceed to block 37 where random code will be generated by the random code generator. As stated above, this random code corresponds to instructions which may or may not cause an event to occur during simulation. Once the random code has been generated at block 37, the random instructions are simulated at block 38. A determination is then made at block 39 as to whether or not an event has been detected. If not, the process will return to block 35 and random code will continue to be generated and simulated at blocks 37 and 38. This process of generating the random code will continue until an exception event is detected at block 39.

Once an event is detected, the random code generator will begin generating the atoms that correspond to the tasks to be performed by the event handler which handles the event, as indicated by block 41. As the atoms are generated, they are inserted into the list, as indicated by block 42. The random code generator determines which of the atoms are unordered and which of the atoms are ordered. As stated above, an unordered atom is the atom that corresponds to the event handler instruction that causes the flow of control to be returned to the instruction that initially caused the event. The ordered atom will be the last atom in the list so that it is ensured that all of the tasks which must be performed by the event handler have been performed before the flow of control is returned to the point at which the event handler was called.

A determination is made at block 43 as to whether or not all of the atoms associated with the event have been generated and inserted into the list. If not, the process returns to block 41. Once all of the atoms have been generated and inserted into the list, the process returns to block 35 where a determination is made as to whether or not the atom list is empty. Assuming an event has occurred and the atom list has been generated, the process will proceed from block 35 to block 36 where a determination is made by the random code generator as to whether or not an atom on the list is to be split. This step in the process is used to allow random code to continue to be generated and simulated after an event has occurred and between the generation and simulation of instructions which correspond to the atoms in the list. In accordance with the preferred embodiment of the present invention, the random code generator is configured so that when the process proceeds to block 36, a certain percentage of the time the process will proceed from block 36 to block 37 and random code will be generated and a certain percentage of time the process will proceed from block 36 to block 46 where an atom is removed from the list and, at block 47, split.

The step represented by block 36 can be performed in a plurality of manners, as will be understood by those skilled in the art. For example, the random code generation program can be designed such that the determination as to whether or not the process proceeds from block 36 to block 37 or from block 36 to block 46 is entirely random. Alternatively, the random code generation program can be designed so that a fixed percentage of the time the process will proceed from block 36 to block 37 and a fixed percentage of time the process will proceed from block 36 to block 46. Those skilled in the art will understand how these different program designs can be achieved.

Assuming the random code generator determines that an atom is to be removed from the list and split, the process will proceed from block 36 to block 46, where an atom is removed from the list. As stated above, preferably the atoms are removed from the list in an order from the top of the list to the bottom of the list. Once the atom has been removed from the list, the random code generator generates the instructions associated with the atom at block 47 and the process proceeds to block 38 where the instructions associated with the atom are simulated. It is possible that in simulating the instructions associated with an atom, these instructions may cause an event to occur. Therefore, the process proceeds to block 39 where a determination is made as to whether or not an event has occurred. If so, the process will proceed to blocks 41, 42 and 43, as discussed above in detail.

If the instructions being simulated that are associated with the atom do not cause an event to occur, the process will proceed from block 39 to block 35 where a determination is made as to whether or not the atom list is empty. Assuming all of the atoms on the list have not yet been processed, the process will proceed to block 36 where the random code generator will make a determination as to whether or not an atom should be removed from the list and split. It is possible that the random code generator will make a determination not to remove an atom from the list and split it. In this case, the process will proceed from block 36 to block 37 and random code will be generated. The random code will then be simulated at block 38 and a determination will be made at block 39 as to whether or not simulation of the random code caused an event to occur. Once all of the atoms in the list have been split, the process will continue to generate and simulate random code. If a determination is made at block 36 that an atom is to be removed from the list and split, the process will proceed to block 46, as discussed above in detail.

Figure 4:
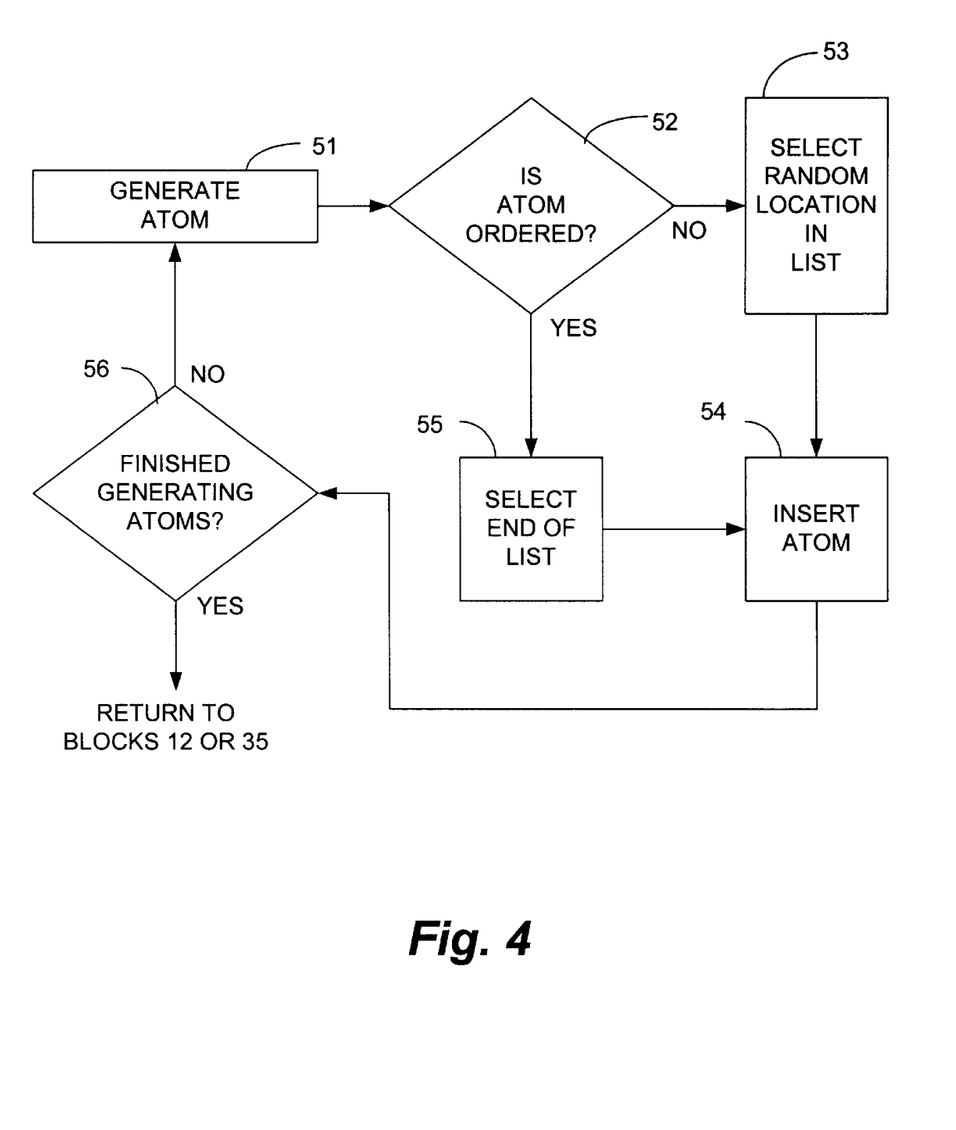
FIG. 4 is a flow chart which provides a detailed illustration of the steps set forth in the flow charts of FIGS. 2 and 3 for generating a list of atoms which correspond to tasks to be performed by a processor in responding to an event.

FIG. 4 is a flow chart illustrating in more detail the process of generating the list of atoms, which corresponds to the steps represented by blocks 25, 27 and 28 in FIG. 2 and to the steps represented by blocks 41, 42 and 43 in FIG. 3. The random code generator has been designed such that when a particular event occurs, the random code generator is provided with all of the atoms that correspond to the event handler. Since the tasks to be performed by each given event handler are known, this information is readily available to the random code generator. In accordance with the preferred embodiment of the present invention, the random code generation program comprises one or more code segments that identify the particular event that has occurred and that generate the atoms which correspond to the event handler. Preferably, each event handler has a particular subroutine associated therewith and these subroutines generate the atoms that are needed to handle the event. Those skilled in the art will understand how these subroutines can be created and embedded in the random code generation program or in a separate program. When the atoms are created they are stored in memory and subsequently are inserted into the list.

Preferably, the atoms stored in memory have identification information stored along with them which indicate whether the atom is ordered or unordered. When the random code generator detects an event, the random code generator begins generating atoms, as represented by block 51. The random code generator then determines whether the atom is ordered or unordered, as indicated by block 52. If a determination is made that the atom is unordered, random location in the list is selected for the atom, as indicated by block 53. The unordered atom is then inserted into the list at the selected location, as indicated by block 54.

If a determination is made at the step represented by block 52 that the atom is ordered, then the random code generator selects the end of the list as the location at which the atom is to be inserted. The ordered atom is then inserted at the end of the list at the step represent by block 54. Each time an atom is inserted into the list at the step represented by block 54, the process proceeds to the step represented by block 56, where a determination is made as to whether or not all of the atoms have been generated. If not, the process proceeds to block 51 and the next atom is generated. If so, the process returns to either the step represented by block 12 in FIG. 2 or to the step represented by block 35 in FIG. 3.

As stated above, when the atoms are removed from the list, as indicated by blocks 16 and 46 in FIGS. 2 and 3, respectively, the atoms are removed from the list in an order from the top of the list to the bottom of the list so that the last atom removed is the ordered atom. This ensures that all of the tasks associated with all of the atoms in the list will be performed before control is transferred from the event handler back to the point of instruction execution at which the event occurred.

A single event could have multiple ordered atoms, each with zero or more unordered atoms in between. This is represented in the figure. Conceptually, this represents a finer granularity to the high level task to be performed. An event handler could generate some atoms to check state, make the last one ordered, then generate more atoms to manipulate state, make the last one ordered, and generate final atoms to complete handling the event. Each mini-task is performed in order, but the sequencing of the subtasks within the mini-task is random. A single event can also have no ordered atoms: the order in which tasks are performed may not be relevant as long as they are performed at some time.

Some atoms may not generate instructions at all. For example, an atom created that is ordered, but that generates no instructions. This allows barriers to be placed between different phases of handling an event. When the atom is split, it does nothing because the purpose of the atom was merely to constrain insertion of other atoms in the list.

It will be understood by those skilled in the art that the present invention has been described with respect to particular embodiments, but that the present invention is not limited to these embodiments. Those skilled in the art will understand that modifications may be made to the embodiments discussed herein which are within the scope of the present invention. For example, as stated above, although particular embodiments have been disclosed which illustrate the manner in which the performance of the tasks associated with event handlers can be randomized, those skilled in the art will understand that there may be other suitable ways of randomizing this process which are not specifically discussed herein, but which are within the scope of the present invention. Those skilled in the art will understand, in view of the discussions provided herein, how such modifications may be made to the present invention and that such modifications are within the scope of the present invention. Those skilled in the art will also understand that the present invention is not limited to any particular type of computer for performing the method of the present invention nor is the present invention limited with respect to the type of computer-readable medium which may be used for storing a program capable of performing the method of the present invention.

What is claimed is:

1. An apparatus for testing architectural compliance of processors, the apparatus comprising:

a computer capable of being configured to execute a testing program, wherein when the computer is executing the testing program, the computer generates instructions and simulates execution of the instructions in a processor, the computer being capable of detecting when simulation of instructions has caused events to occur in the processor, the computer generating a plurality of atoms and storing the atoms in a memory device in communication with the computer, each of said atoms corresponding to a description of a particular event handler task to be performed by the processor in response to an occurrence of one of the events, wherein the computer reads said atoms out of the memory device and generates and simulates instructions corresponding to said atoms in order to handle the events, and wherein the computer randomizes an order of one or more of said atoms thereby causing one or more of said instructions corresponding to said atoms to be simulated in a random order.

2. The apparatus of claim 1, wherein the computer separates said atoms into ordered atoms and unordered atoms, and wherein said one or more randomized atoms are identified by the computer as unordered atoms.

3. The apparatus of claim 1, wherein said order of said one or more atoms corresponds to an order that said one or more atoms are stored in the memory device.

4. The apparatus of claim 1, wherein said order of said one or more atoms corresponds to an order that said one or more atoms are read from the memory device.

5. A method for testing architectural compliance of processors, the method being performed by a computer executing a test program, the method comprising the steps of:

generating instructions and simulating execution of the instructions by a processor being tested, wherein a computer generates the instructions and simulates execution of the instructions by the processor;

detecting, in the computer, when simulating the execution of the instructions would have caused events to occur in the processor;

generating a plurality of atoms and storing said atoms in a memory device in communication with the computer, each of said atoms corresponding to a description of a particular event handler task to be performed by the processor in response to the occurrence of one of the events;

utilizing the computer to read said atoms out of the memory device and to generate and simulate instructions for handling the events, wherein said instructions for handling the events correspond to said atoms;

randomizing an order of one or more of said atoms; and causing, based on the randomizing step, one or more of said instructions to be simulated in a random order.

6. The method of claim 5, further comprising the step of separating said atoms into ordered atoms and unordered atoms, wherein said randomizing step is based on said separating step.

7. A computer-readable medium encoded with a computer program, the computer program being a test program for testing processors for architectural compliance, the program comprising:

a first code segment for generating instructions and simulating execution of the instructions by a processor;

a second code segment for detecting when simulating the execution of the instructions would have caused events to occur in the processor;

a third code segment for generating atoms, each of said atoms corresponding to a description of a particular event handler task to be performed by the processor in response to an occurrence of one of the events;

a fourth code segment for storing said atoms in a memory device; and a fifth code segment for reading said atoms out of the memory device and for generating and simulating instructions corresponding to said atoms in order to handle the events, wherein one of the fourth and fifth code segments randomizes an order of one or more of said atoms thereby causing one or more of said instructions corresponding to said atoms to be simulated in a random order.

8. The computer-readable medium of claim 7, wherein the fifth code segment separates said atoms into ordered atoms and unordered atoms, and wherein said one or more randomized atoms are identified by the computer as unordered atoms.

9. An apparatus for testing architectural compliance of processors, the apparatus comprising:

a computer capable of being configured to execute a testing program, wherein when the computer is executing the testing program, the computer generates instructions and simulates execution of the instructions in a processor, the computer being capable of detecting when simulation of an instruction has caused an event to occur in the processor, the computer identifying the event that has occurred and generating at least one atom and storing the atom in a memory device in communication with the computer, said at least one atom corresponding to a description of a particular event handler task to be performed by the processor in response to the occurrence of the event, wherein the computer reads said at least one atom out of the memory device and generates and simulates one or more instructions corresponding to said at least one atom in order to handle the event, wherein when the computer identifies the event that has occurred, the computer generates a list of a plurality of atoms and stores the list in the memory device, each of the atoms in the list corresponding to a description of a particular event handler task to be performed by the processor in response to the occurrence of the event, wherein the list of atoms comprises at least one unordered atom and at least one ordered atom, said at least one unordered atom corresponding to one or more event handler tasks that can be performed in any order, said at least one ordered atom corresponding to one or more event handler tasks that must be performed after said one or more tasks associated with the unordered atom have been performed, wherein the computer reads the atoms out of the list and generates and simulates one or more instructions corresponding to each of the atoms, wherein the computer simulates one or more instructions corresponding to said at least one unordered atom before the computer simulates one or more instructions corresponding to said at least one ordered atom.

10. The apparatus of claim 7, wherein the computer randomly selects locations in the list in which said at least one unordered atom is to be stored and stores said at least one unordered atom at the selected location, and wherein the computer stores the ordered atom at a particular location in the list, and wherein the computer reads the atoms out of the list in a such a sequence that said at least one ordered atom is the last atom read out of the list, and wherein the computer generates and simulates instructions corresponding to each of the atoms as the atoms are read out of the list.

11. The apparatus of claim 10, wherein the particular location at which said at least one ordered atom is stored is at the end of the list, and wherein the computer reads the atoms out of the list in sequence from a top of the list to a bottom of the list such that said at least one ordered atom is the last atom read out of the list, and wherein the computer generates and simulates instructions corresponding to each of the atoms as the atoms are read out of the list.

12. The apparatus of claim 10, wherein the test program is a random code generation program and wherein after an unordered atom has been read out of the list and before an ordered atom has been read out of the list, the random code generation program generates at least one random instruction and simulates said at least one random instruction.

13. The apparatus of claim 12, wherein after an event has been detected, the random code generation program makes a determination as to whether a random instruction should be generated and simulated or whether an atom should be read out of the list and an instruction corresponding to the atom should be generated and simulated, wherein on some occasions the random code generation program determines that a random instruction should be generated and simulated and on other occasions the random code generation program determines that an atom should be read from the list and an instruction corresponding to the atom should be generated and simulated.

14. The apparatus of claim 13, wherein the determination is random.

15. The apparatus of claim 13, wherein if a previous determination was made to generate and simulate a random instruction, then the random code generation program will make a determination to read out an atom from the list and generate and simulate an instruction corresponding to the atom read out from the list.

16. The apparatus of claim 9, wherein the computer generates the list of atoms and stores them in the list in the memory device by determining whether an atom is ordered or unordered, wherein if a determination is made that the atom is unordered, the computer randomly selects a location in the list and stores the unordered atom in the selected location, and wherein if the computer determines that the atom is ordered, then the computer stores the ordered atom at the end of the list, wherein each time an atom is stored in the list, the computer determines whether all of the atoms needed to handle the event have been generated and stored in the list, wherein once a determination has been made that all of the atoms needed to handle the event have been generated, the computer makes the determination of whether to generate and simulate a random instruction or whether to read an atom out of the list and generate and simulate an instruction corresponding to the atom.

17. A method for testing architectural compliance of processors, the method being performed by a computer executing a test program, the method comprising the steps of:

generating instructions and simulating execution of the instructions by a processor being tested, wherein a computer generates the instructions and simulates execution of the instructions by the processor;

detecting, in the computer, when simulating the execution of an instruction would have caused an event to occur in the processor;

identifying the event and generating at least one atom and storing said at east one atom in a memory device in communication with the computer, said at least one atom corresponding to a description of a particular event handler task to be performed by the processor in response to the occurrence of the event; and utilizing the computer to read said at least one atom out of the list and to generate and simulate one or more instructions corresponding to said at least one atom, wherein the computer simulates one or more instructions corresponding to said at least one atom in order to handle the event, wherein when an event is identified, a list of a plurality of atoms is generated and stored in the memory device, each of the atoms in the list corresponding to a description of a particular event handler task to be performed by the processor in response to the occurrence of the event, wherein the list of atoms comprises at least one unordered atom and at least one ordered atom, said at least one unordered atom corresponding to one or more event handler tasks that can be performed in any order, said at least one ordered atom corresponding to one or more event handler tasks that must be performed after said one or more tasks associated with the unordered atom have been performed, and wherein during the utilizing step the computer reads the atoms out of the list and generates and simulates one or more instructions corresponding to each of the atoms, wherein the computer simulates one or more instructions corresponding to said at least one unordered atom before the computer simulates one or more instructions corresponding to said at least one ordered atom.

18. The method of claim 17, wherein during the step of storing the atoms in the list, the computer randomly selects locations in the list in which said at least one unordered atom is to be stored and stores said at least one unordered atom at the selected location, and wherein the computer stores the ordered atom at a particular location in the list, and wherein during the step or reading the atoms out of the list, the computer reads the atoms out of the list in a such a sequence that said at least one ordered atom is the last atom read out of the list, and wherein the computer generates and simulates instructions corresponding to each of the atoms as the atoms are read out of the list.

19. The method of claim 18, wherein the computer stores said at least one ordered atom at the end of the list, and wherein during the step of reading the atoms out of the list, the computer reads the atoms out of the list in sequence from a top of the list to a bottom of the list such that said at least one ordered atom is the last atom read out of the list, and wherein the computer generates and simulates instructions corresponding to each of the atoms as the atoms are read out of the list.

20. The method of claim 19, wherein the test program is a random code generation program, wherein during the step of utilizing the computer to read the atoms out of the list and to generate and simulate one or more instructions corresponding to each of the atoms, after an unordered atom has been read out of the list and before an ordered atom has been read out of the list, the random code generation program generates at least one random instruction and simulates said at least one random instruction.

21. The method of claim 20, wherein during the step of utilizing the computer to read the atoms out of the list and to generate and simulate one or more instructions corresponding to each of the atoms, and after an event has been detected, the random code generation program makes a determination as to whether a random instruction should be generated and simulated or whether an atom should be read out of the list and an instruction corresponding to the atom should be generated and simulated, and wherein on some occasions the random code generation program determines that a random instruction should be generated and simulated and on other occasions the random code generation program determines that an atom should be read from the list and an instruction corresponding to the atom should be generated and simulated.

22. The method of claim 21, wherein the determination is random.

23. The method of claim 21, wherein if a previous determination was made to generate and simulate a random instruction, then the random code generation program will make a determination to read out an atom from the list and generate and simulate an instruction corresponding to the atom read out from the list.

24. The method of claim 21, wherein the step of utilizing the computer to read the atoms out of the list and to generate and simulate one or more instructions corresponding to each of the atoms further comprises the step of:

determining, in the computer, whether each atom is ordered or unordered, wherein if a determination is made that an atom is unordered, the computer randomly selects a location in the list and stores the unordered atom in the selected location, and wherein if the computer determines that the atom is ordered, then the computer stores the ordered atom at the end of the list, wherein each time an atom is stored in the list, the computer determines whether all of the atoms needed to handle the event have been generated and stored in the list, wherein once a determination has been made that all of the atoms needed to handle the event have been generated, the computer makes the determination of whether to generate and simulate a random instruction or whether to read an atom out of the list and generate and simulate an instruction corresponding to the atom.

25. A computer-readable medium encoded with a computer program, the computer program being a test program for testing processors for architectural compliance, the program comprising:

a first code segment for generating instructions and simulating execution of the instructions by a processor;

a second code segment for detecting when simulating the execution of an instruction would have caused an event to occur in the processor;

a third code segment for identifying the event and for generating at least one atom, said at least one atom corresponding to a description of a particular event handler task to be performed by the processor in response to the occurrence of the event;

a fourth code segment for storing said at least one atom in a memory device; and a fifth code segment for reading said at least one atom out of the list and for generating and simulating one or more instructions corresponding to said at least one atom in order to handle the event, wherein when the third code segment identifies the event, the third code segment generates a list of a plurality of atoms, each of the atoms in the list corresponding to a description of a particular event handler task to be performed by the processor in response to the occurrence of the event, the fourth code segment storing the list of atoms in the memory device, wherein the list of atoms comprises at least one unordered atom and at least one ordered atom, said at least one unordered atom corresponding to one or more event handler tasks that can be performed in any order, said at least one ordered atom corresponding to one or more event handler tasks that must be performed after said one or more tasks associated with the unordered atom have been performed, wherein, in generating the list, the third code segment randomly selects locations in the list in which said at least one unordered atom is to be inserted and inserts said at least one unordered atom at the selected location, and wherein the third code segment inserts the ordered atom at a particular location in the list, and wherein the fifth code segment reads the atoms out of the list in a such a sequence that said at least one ordered atom is the last atom read out of the list, and wherein the fifth code segment generates and simulates instructions corresponding to each of the atoms as the atoms are read out of the list.

26. An apparatus for testing architectural compliance of processors, the apparatus comprising:

a computer capable of being configured to execute a testing program, wherein when the computer is executing the testing program, the computer generates instructions and simulates execution of the instructions in a processor, the computer being capable of detecting when simulation of instructions has caused events to occur in the processor, the computer generating a plurality of atoms, each of said atoms corresponding to a description of a particular event handler task to be performed by the processor in response to an occurrence of one of the events, wherein the computer makes determinations as to which of the atoms are unordered, and wherein the computer generates and simulates, based on the determinations, randomly ordered instructions corresponding to one or more of said atoms that are determined by the computer as being unordered.

27. The apparatus of claim 26, wherein the computer stores said atoms in a memory device in communication with the computer, and wherein the computer, based on the determinations, randomizes an order that said one or more atoms are stored in the memory device.

28. The apparatus of claim 26, wherein the computer stores said atoms in a memory device in communication with the computer, and wherein the computer, based on the determinations, randomizes an order that said one or more atoms are read from the memory device.

29. A method for testing architectural compliance of processors, the method being performed by a computer executing a test program, the method comprising the steps of:

generating instructions and simulating execution of the instructions by a processor being tested, wherein a computer generates the instructions and simulates execution of the instructions by the processor;

detecting, in the computer, when simulating the execution of the instructions would have caused events to occur in the processor;

generating a plurality of atoms, each of said atoms corresponding to a description of a particular event handler task to be performed by the processor in response to the occurrence of one of the events;

determining, in the computer, which of said atoms are unordered; and utilizing the computer to generate and simulate, based on the determining step, randomly ordered instructions corresponding to one or more of said atoms that are determined to be unordered.

30. The method of claim 29, further comprising the steps of:

storing said atoms in a memory device in communication with the computer; and randomizing an order that said one or more atoms are stored in the memory device.

31. The method of claim 29, further comprising the steps of:

storing said atoms in a memory device in communication with the computer;

reading said one or more atoms from the memory device; and randomizing an order that said one or more atoms are read from the memory device via the reading step.

* * * * *

UNITED STATES PATENT AND TRADEMARK OFFICE
CERTIFICATE OF CORRECTION

PATENT NO. : 6,564,178 B1 Page 1 of 1
DATED : May 13, 2003
INVENTOR(S) : Karl P. Brummel It is certified that error appears in the above-identified patent and that said Letters Patent is hereby corrected as shown below:

Column 15,
Line 13, delete "step or reading" and insert therefor --step of reading --

Signed and Sealed this

Eighth Day of February, 2005

JON W. DUDAS
*Director of the United States Patent and Trademark Office*